United States Patent [19]
Walker

[11] 3,974,546
[45] Aug. 17, 1976

[54] CONTINUOUS LOOP SLIP TONGUE

[75] Inventor: Ronald J. Walker, Sterling Heights, Mich.

[73] Assignee: The Firestone Tire & Rubber Company, Akron, Ohio

[22] Filed: Oct. 2, 1975

[21] Appl. No.: 618,891

[52] U.S. Cl. ................................ 24/196; 297/389
[51] Int. Cl.² ................... A62B 35/00; A44B 11/10
[58] Field of Search ........................... 297/389, 388; 280/150 SB; 24/171, 163 R, 196

[56] References Cited
UNITED STATES PATENTS

| | | |
|---|---|---|
| 2,919,481 | 1/1960 | Finken et al. ........................ 24/196 |
| 3,494,665 | 2/1970 | Klink ................................ 297/389 |
| 3,561,070 | 2/1971 | Harmon ............................. 24/196 |
| 3,725,982 | 4/1973 | Fisher ................................ 24/196 |
| 3,820,842 | 6/1974 | Stephenson ....................... 297/389 |

FOREIGN PATENTS OR APPLICATIONS 993,396  5/1965  United Kingdom ............... 297/389

Primary Examiner—Donald A. Griffin
Attorney, Agent, or Firm—William J. Morriss

[57] ABSTRACT

A continuous loop slip tongue element having an integral channel housing portion which is provided with a seat belt webbing aperture having a transverse lock buttress edge portion. A round bar element is rollably mounted within the channel housing across the seat belt webbing aperture and has a seat belt webbing slot therethrough. A seat belt webbing is freely positioned through the housing seat belt webbing aperture to slidably pass through the round bar seat belt webbing slot so that the continuous loop slip tongue element is freely movable along the seat belt webbing until the slip tongue element is moved to its operative use position in engagement with a buckle assembly which causes the webbing to reverse itself in direction. This action of the webbing moves and rotates the round bar element to a lockably stressed position within the channel housing so as to lockably retain the seat belt webbing against the lock buttress edge portion defined by the channel housing aperture. In the preferred embodiment, the round bar is formed from two elongate identical elements each having a mating dropped portion so that when the two elements are joined as by Teflon rings and oriented by pins, they form the round and slotted bar.

4 Claims, 4 Drawing Figures

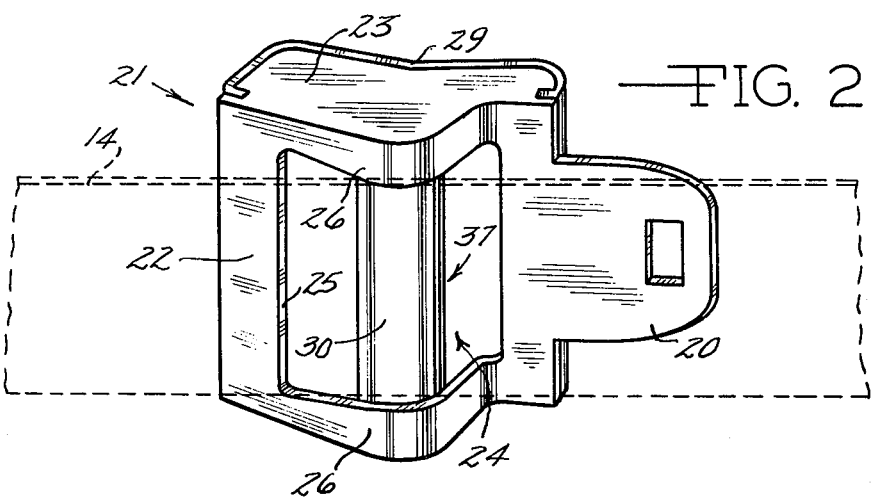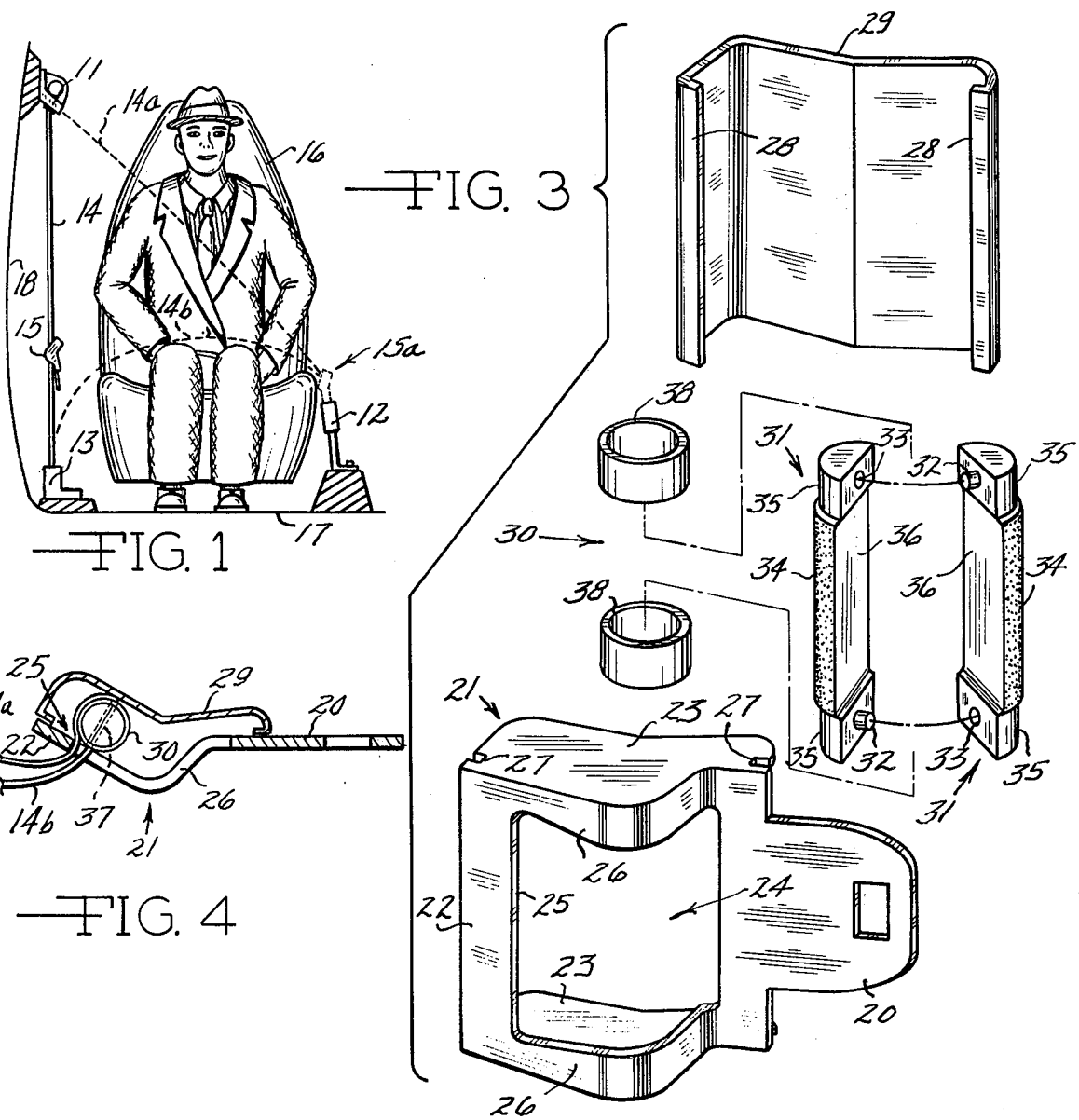

CONTINUOUS LOOP SLIP TONGUE

This invention relates to a continuous loop slip tongue element which is freely movable along a seat belt webbing upon which it is mounted but which is locked against movement when the webbing reverses on itself in its operative use position. The invention further relates to a continuous loop slip tongue element having an integral channel housing portion which is provided with a seat belt webbing aperture which defines a lock buttress edge portion. A seat belt engaging round bar element is rollably mounted within the housing portion across the seat belt webbing aperture and which is provided with a seat belt webbing slot therethrough. A seat belt webbing is freely positioned through the housing seat belt webbing aperture to slidably pass through the round bar seat belt webbing slot so that the continuous loop slip tongue element is freely movable along the seat belt webbing until the slip tongue element is moved to its operative use position on engagement with a buckle assembly which causes the webbing to reverse itself in direction. This action of the webbing moves and rotates the round bar element to a lockably stressed position within the housing so as to retain the seat belt webbing against the lock buttress edge portion defined by the channel housing aperture.

None of the known prior art devices teach a continuous loop slip tongue plate which is freely movable along a seat belt webbing harness to a lock position when the webbing doubles back on itself in its operative use position. Nowhere in the prior art is there shown a round bar element rollably mounted within a channel housing integral with a seat belt tongue plate. In addition, the devices of the prior known art do not use a round bar which is provided with a seat belt webbing slot which slidably receives a seat belt webbing therethrough so that the continuous loop slip tongue plate is freely movable along the seat belt webbing until the webbing is moved to a position which rotates the round bar to a stressed lock position within the housing to retain the seat belt webbing against movement.

Examples of prior art devices are seen in the U.S. Pat. Nos. 3,605,209 to Alarcon, 3,533,141 to Unai, 3,237,263 to Holmberg, 3,561,070 to Harmon, and 3,725,982 to Fisher.

A need has existed for a continuous loop slip tongue plate which permits the tongue plate to freely travel up and down a course of webbing, but when the tongue plate is moved into locking engagement with the buckle lock assembly, the lap portion of the seat belt webbing is locked or jammed against movement even though there is failure of the shoulder portion of the webbing.

It is therefore an object of this invention to provide a continuous loop slip tongue plate assembly which is adapted to be freely movable along a course of seat belt webbing upon which it is mounted, but which selectively locks the seat belt webbing against movement therethrough when the seat belt webbing reverses upon itself in its operative use position.

Another object of this invention is a continuous loop slip tongue plate having a housing integral therewith which is provided with a seat belt webbing aperture and having a seat belt engaging round bar element rollably mounted therein.

Yet another object of this invention is to provide a continuous loop slip tongue plate housing having a round bar element rollably mounted therein and which has a seat belt engaging slot therethrough.

Another object is to teach the economical and improved construction of the slotted round bar in halves secured together by retainer ring bands or bearing members.

A still further object of this invention is to provide a continuous loop slip tongue assembly having a round bar element which is selectively movable and rotatable within the housing portion in response to selected movement of the seat belt webbing in engagement therewith.

Yet another object of this invention is to provide a continuous loop slip tongue assembly wherein lap portion of the seat belt webbing is locked or jammed against movement even though there is failure of the shoulder portion of the webbing.

Other objects will be apparent to those skilled in the art upon reading the present description, drawings and claims.

In the Drawings:

FIG. 1 is a front schematic in use view of a seat belt assembly with the continuous loop slip tongue in operative engagement with the seat belt webbing and showing in phantom line the seat belt assembly in its operative use position with the slip tongue element in locked engagement with a buckle assembly.

FIG. 2 is a perspective view of the continuous loop slip tongue assembly showing the tongue plate portion provided with an integral channel housing portion having a seat belt aperture in the base thereof and showing a round locking bar rollably mounted within the channel housing. The seat belt webbing (shown in phantom line) is freely positioned through a seat belt engaging slot provided in the round bar.

FIG. 3 is an exploded schematic of the continuous loop slip tongue assembly showing the tongue plate with the integral channel portion, the components forming the round bar element and the cover member.

FIG. 4 is a cross-sectional view of the continuous loop slip tongue assembly showing the round locking bar member in its rotated locked stress position within the channel housing retaining the seat belt webbing against the lock buttress edge of the seat belt aperture.

DESCRIPTION OF A PREFERRED EMBODIMENT

As shown in FIG. 1, a representative automobile seat belt assembly is shown consisting of an upper vertical post or ceiling mounted retractor mechanism 11, a floor mounted buckle assembly 12, a lower floor mounted anchor member 13, seat belt webbing 14 and a continuous loop slip tongue plate assembly 15. The automobile seat 16 is mounted on the vehicle floor 17 adjacent the vertical post or side 18.

As shown generally in the drawings and specifically in FIG. 3, the continuous loop slip tongue assembly 15 consists of a body member 19 having a tongue plate portion 20 which is provided with an integral extended channel housing portion 21. The channel housing 21 has a raised offset transversely bent bottom portion 22 and side walls 23. A seat belt receiving aperture 24 is provided in the transversely bent bottom portion 22. The aperture 24 is defined in part by a lock buttress edge portion 25 and support track flange portions 26 extending from the side walls 23. The side walls 23 are provided with notched portions 27 which lockably receive the flange portions 28 of a cover member 29 so as to retain the cover member 29 in matingly engagement with the edges of the side walls 23.

A seat belt engaging round bar 30 is freely positioned within the channel housing portion 21 so as to transversely extend across the seat belt aperture 24 as shown in FIG. 2. As shown in FIG. 3, the round bar 30 is formed by two cylindrical bar halves 31 which are matingly joined by use of corresponding pins 32 and pin holes 33 provided at the ends thereof. The curved portion of each bar half 31 consists of a central raised knurled or friction inducing gripping surface 34 and provided with end portions 35 having a smooth bearing surface. Each bar half 31 has a central flat recessed portion 36 which cooperates to form an elongate longitudinally oriented seat belt receiving slot 37 through the round bar 30 formed when the bar halves are joined.

The ends 35 of the round bar 30 are provided with plastic retainer ring bearing members 38 which bear against the inner surfaces of the support track flanges 26 so as to support the round bar 30 in transversely oriented position across the seat belt aperture 24.

OPERATION

As shown in FIG. 1, the user sits in the automobile seat 16 which is mounted on the vehicle floor 17 adjacent the side wall or vertical post 18 of the vehicle. When the seat belt webbing 14 is in its stored position, it extends vertically from the retractor mechanism 11 to the anchor member 13. In the stored position of the seat belt assembly, the continuous loop slip tongue assembly 15 is freely mounted on the seat belt webbing 14 with webbing 14 in a free flow position through the slot 37 provided in the round bar 30. This is shown schematically in FIG. 2 with the round bar 30 in its free rest position in the apex of the raised transversely bent bottom portion 22. In this position, the slot 37 and the seat belt webbing 14 lie in a plane substantially parallel to and spaced-apart from the tongue plate portion 20, with the seat belt webbing 14 passing freely into the housing seat belt aperture 24 through the seat belt slot 37 and then out of the seat belt aperture 24 as shown.

As further shown in phantom-line in FIG. 1, the seat belt webbing 14 is moved to its operative use position by pulling the continuous loop slip tongue plate assembly 15 across the lap of the user to its lock position 15a in engagement with the buckle assembly 12. In this position, the portion of seat belt webbing above the slip tongue plate becomes the shoulder portion 14a and the portion below becomes the lap portion 14b.

As the continuous loop slip tongue plate 15 is moved toward the buckle assembly 12, it freely traverses along the seat belt webbing 14. The passage of the seat belt webbing 14 through the slot 37 provided through the round bar 30 prevents the webbing from roping and twisting as the continuous loop slip tongue plate assembly 15 is moved therealong.

As the continuous loop slip tongue plate assembly 15 is moved into locking engagement with the buckle 12, the lower portion 14b of the seat belt webbing reverses itself relative to the tongue plate assembly 15. This action causes the round bar 30 to slidably and rotatably move to its locked position shown in FIG. 4. As shown, the round bar 30 is rolled back within the tongue plate housing 21 with slot 37 substantially perpendicular to the bottom portion 22 of the housing 21. This position creates a locking webbing to webbing transverse contact against the lock buttress edge portion 25. When the continuous loop slip tongue plate 15 is in fully locked engagement with the buckle 12, the lap portion 14b of the seat belt webbing pressably contacts the shoulder portion 14a of the webbing and retains it against the edge portion 25. This relative positioning is shown in FIG. 4. However, for purposes of clarity the webbing portions are shown in spaced-apart positions adjacent the edge portion 25.

It is thus seen that the foregoing locking web to web contact permits the lap portion 14b to remain locked or jammed against movement even though there is or may be a failure of the shoulder portion 14a. Even though the shoulder portion 14a of the seat belt goes slack due to failure of the webbing itself or of the retractor mechanism 11, the lap portion 14b exerts locking pressure on that part of the shoulder portion 14a which is intermediate the lock buttress edge or barrier 25 and the lap portion 14b pulled barrier 25 is by a ramp-like movement of bar 30 on track flanges 26.

Release of the webbing is easily accomplished by unlocking the slip tongue plate from the buckle assembly 12 and moving it back across the lap of the user toward the side 18 of the vehicle. This causes the lap portion 14b to pull away from its web to web contact with the shoulder portion 14a of the web along the lock buttress edge 25 back into a plane substantially parallel with the tongue plate portion 20. This causes the round bar 30 to slidably rotate back to its free position in the apex of the channel housing bottom portion 22 as the webbing freely moves therethrough into the storage position shown in FIGS. 1 and 2.

From this presentation of an operative embodiment of my invention, improvements, modifications and substitutions will become apparent to those skilled in the art. Such improvements, modifications and substitutions are intended to be included within the spirit of the invention limited only by the scope of the hereinafter appended claims.

I claim:
1. A slip tongue plate assembly for seat belts and the like comprising:
   a tongue plate having an integral channel housing extending therefrom, said channel housing having a raised transversely bent bottom portion and spaced-apart side walls, said bottom portion having a seat belt webbing aperture therethrough, said aperture defined at one end by a transverse lock buttress edge and support track flanges extending from said side walls;
   a round bar freely mounted within said channel housing on said support track flanges so as to transversely extend across said seat belt webbing aperture, said round bar provided with an elongate seat belt webbing receiving slot having seat belt webbing freely positioned therethrough, said round bar being freely slidable and rotatable on said support track flanges within said housing along said aperture while permitting free movement of the seat belt webbing through said slot, said round bar being rotatable and lockable upon said lock buttress edge so as to lock said webbing against movement when said webbing is stressed to reverse upon itself.

2. In the slip tongue plate seat belt assembly of claim 1 wherein said round bar is comprised of a joined pair of opposed mating cylindrical halves, each of said cylindrical halves provided with an outer central raised curved portion having a roughened gripping surface and having an inner central recessed flat surface, said inner central recessed flat surface defining an elongate seat belt webbing slot through the round bar formed by said mating cylindrical halves.

3. In the slip tongue plate seat belt assembly of claim 2 wherein said round bar is provided with retainer ring bearing members at each end thereof.

4. A slip tongue plate element for continuous loop seat belts and the like comprising:

a frame housing having an integral extending tongue plate portion, integral side portions provided with support track flanges extending therefrom and a transversely bent bottom portion having an aperture defined therethrough, including a barrier at one end of said aperture;

a slotted round bar provided in said frame housing, said bar journalled on the ends thereof on said support track flanges and slidable and rotatable on said track flanges toward and away from said barrier at one end of said aperture; and a continuous piece of seat belt webbing extending through said slotted round bar, said webbing freely movable through said bar when said bar moves away from said barrier and locked by said bar against said barrier of said frame upon partial rotation of said bar when said webbing is reversed upon itself.

* * * * *

UNITED STATES PATENT OFFICE
CERTIFICATE OF CORRECTION

Patent No. 3,974,546  Dated  1976 August 17

Inventor(s)  Ronald J. Walker

It is certified that error appears in the above-identified patent and that said Letters Patent are hereby corrected as shown below:

Column 4, line 16, after "pulled" insert --- therearound. The
lock against ---

Signed and Sealed this

Thirty-first Day of May 1977

[SEAL]

Attest:

RUTH C. MASON  
Attesting Officer

C. MARSHALL DANN  
Commissioner of Patents and Trademarks